US007726032B1

(12) United States Patent
Hernandez

(10) Patent No.: US 7,726,032 B1
(45) Date of Patent: Jun. 1, 2010

(54) SAFETY RAZOR HANDLE ASSEMBLY

(76) Inventor: Elisa M. Hernandez, 5515 W. Sunnyside Dr., Glendale, AZ (US) 85304

( * ) Notice: Subject to any disclaimer, the term of this patent is extended or adjusted under 35 U.S.C. 154(b) by 0 days.

(21) Appl. No.: 11/546,642

(22) Filed: Oct. 12, 2006

Related U.S. Application Data

(60) Provisional application No. 60/729,539, filed on Oct. 25, 2005.

(51) Int. Cl.

| | |
|---|---|
| ***B26B 21/00*** | (2006.01) |
| ***B26B 19/38*** | (2006.01) |
| ***B26B 1/00*** | (2006.01) |
| ***B26B 27/00*** | (2006.01) |
| ***B65G 7/12*** | (2006.01) |
| ***A47J 45/00*** | (2006.01) |
| ***A46B 7/04*** | (2006.01) |
| ***A46B 17/02*** | (2006.01) |
| ***A47B 95/02*** | (2006.01) |

(52) U.S. Cl. ........................... 30/526; 30/51; 30/34.05; 30/334; 30/337; 30/537

(58) Field of Classification Search ................... 30/251, 30/250, 255, 260, 312, 340, 90, 66, 67, 526, 30/334, 337, 537, 517, 34.05, 34, 47, 51, 30/35, 298; 15/176.1, 144.1, 144.3, 145, 15/146, 143.1, 149, 236.01; 16/110.1–114.1, 16/110.5, 115; 81/177.2, 73, 177.9; 132/289; 403/326, 329, 317, 319; D28/44–48, 16, D28/10; D8/107, 97, 94, 83; 7/167; 294/30, 294/26

See application file for complete search history.

(56) References Cited

U.S. PATENT DOCUMENTS 1,437,296 A * 11/1922 Dyer .......................... 15/151
2,799,927 A * 7/1957 Beham .......................... 30/66
3,271,805 A * 9/1966 Sawyer ...................... 15/176.1
4,084,316 A * 4/1978 Francis .......................... 30/47
4,589,308 A * 5/1986 Palm ....................... 81/177.85
4,644,600 A * 2/1987 Fugate .......................... 7/166
4,905,372 A * 3/1990 Willis .......................... 30/526
5,435,066 A * 7/1995 Bare et al. .................... 30/388
5,493,758 A * 2/1996 Carmien ...................... 16/429
5,497,551 A 3/1996 Apprille, Jr.
5,564,152 A * 10/1996 Jeannet et al. ............ 15/167.1
5,600,887 A * 2/1997 Olson ........................ 30/41.5
5,687,485 A 11/1997 Shurtleff et al.
5,903,978 A 5/1999 Prochaska et al.
5,911,480 A * 6/1999 Morgan ........................ 30/41
5,913,317 A * 6/1999 Tiram ........................ 132/291
D439,015 S 3/2001 Wonderley
D454,413 S 3/2002 Shepperson
D464,172 S 10/2002 Shepperson
D500,173 S 12/2004 Wakayama
2003/0177648 A1* 9/2003 Zeiter ......................... 30/526
2004/0107585 A1* 6/2004 Helmrich .................... 30/537

* cited by examiner

*Primary Examiner*—Boyer D Ashley
*Assistant Examiner*—Bharat C Patel
(74) *Attorney, Agent, or Firm*—Parsons & Goltry; Robert A. Parsons; Michael W. Goltry

(57) ABSTRACT

A safety razor handle assembly including a safety razor having a handle and a razor blade head. The assembly including an elongated body portion, a hand gripping portion affixed to one end of the elongated body portion, and a safety razor engaging portion affixed to the other end. The razor engaging portion engaging the handle of the safety razor so that the handle of the safety razor extends axially from the elongated body portion and the blade head of the safety razor extends laterally beyond the safety razor engaging portion.

16 Claims, 3 Drawing Sheets

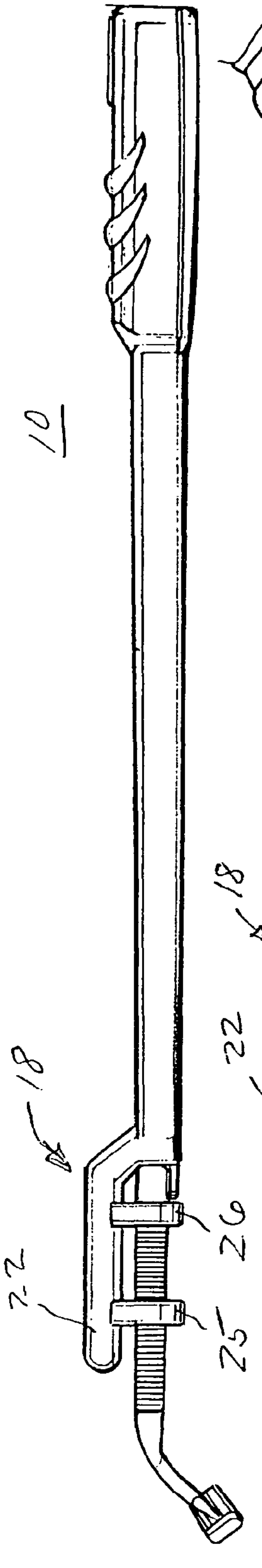
FIG. 2
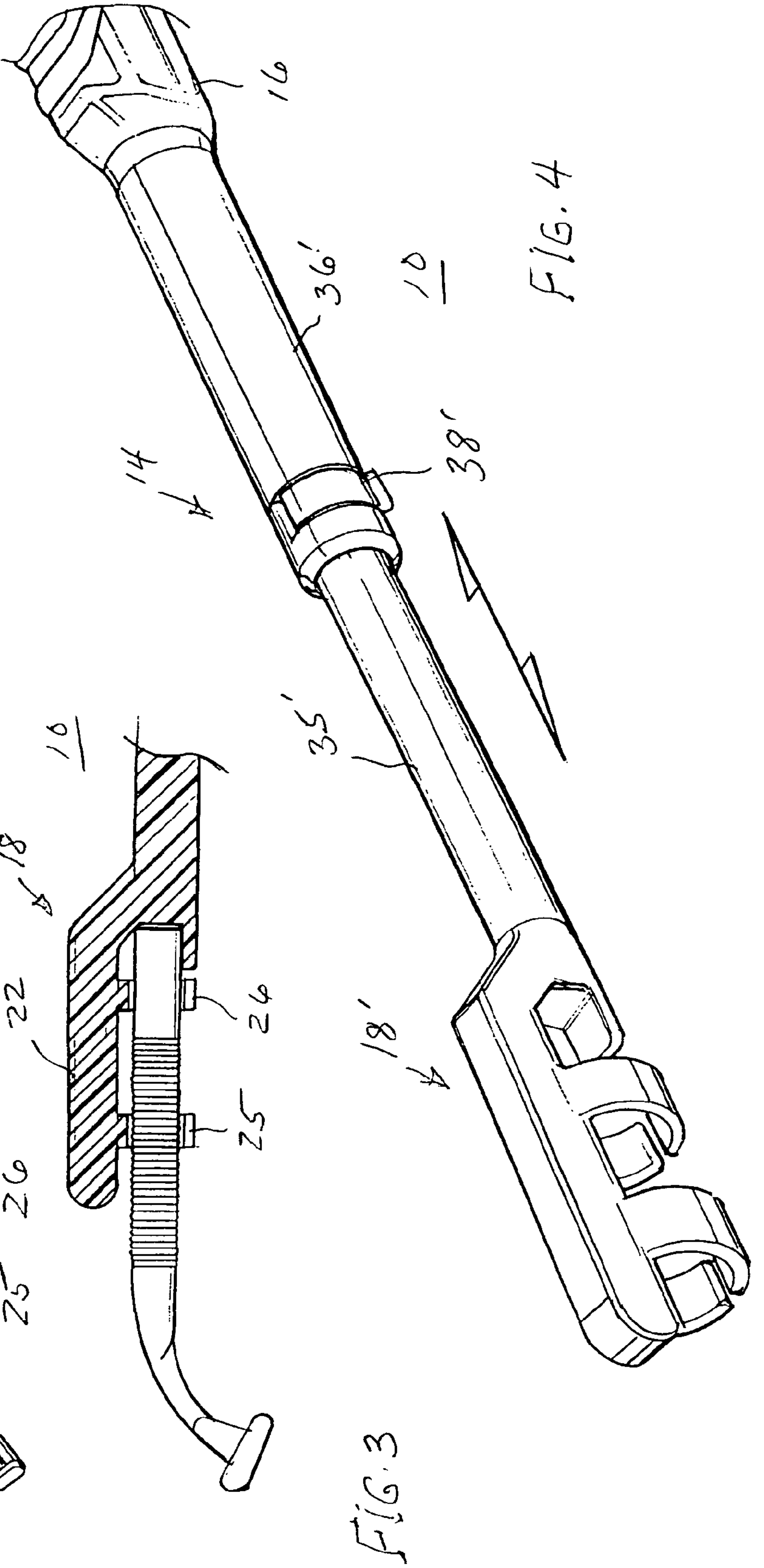
FIG. 3
FIG. 4

SAFETY RAZOR HANDLE ASSEMBLY

CROSS-REFERENCE TO RELATED APPLICATIONS

This application claims the benefit of U.S. Provisional Application No. 60/729,539, filed 25 Oct. 2005.

FIELD OF THE INVENTION

This invention generally relates to safety razor handles and more specifically to a razor handle that is extended for shaving legs and the like.

BACKGROUND OF THE INVENTION

When women shave their legs it can be very difficult to reach all areas of the legs. This is especially true if the woman is either large or may have some physical handicaps. Also, it is often more convenient to perform the shaving in a shower or bath so that the skin remains moist for movement of the razor and so that hair is immediately removed. Bending over and twisting to reach all parts of the legs can be dangerous in a shower or bath since the person could slip and get hurt, as well as cut themselves.

It would be highly advantageous, therefore, to remedy the foregoing and other deficiencies inherent in the prior art.

Accordingly, it is an object of the present invention to provide a new and improved safety razor handle to eliminate bending and twisting during shaving of the legs.

SUMMARY OF THE INVENTION

The above objects and others are realized in a safety razor handle assembly designed to engage a safety razor having a handle and a razor blade head. The assembly includes an elongated body portion having a hand gripping portion affixed to one end and a safety razor engaging portion affixed to the other end. The razor engaging portion engages the handle of the safety razor so that the handle of the safety razor extends axially from the elongated body portion and the blade head of the safety razor extends laterally beyond the safety razor engaging portion. A user may then engage a common safety razor in the handle assembly and shave their legs without reaching or bending, within any type of bathing and/or showering unit, and without placing herself at risk of slipping and falling.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which:

FIG. 2 is a side elevational view of the extended handle and safety razor of FIG. 1;

FIG. 3 is a sectional view, portions thereof broken away, of the safety razor engaged in the extended handle;

FIG. 4 is a view in perspective illustrating an embodiment of the safety razor handle that is extendable, in accordance with the present invention.

DETAILED DESCRIPTION OF A PREFERRED EMBODIMENT

Figure 1:
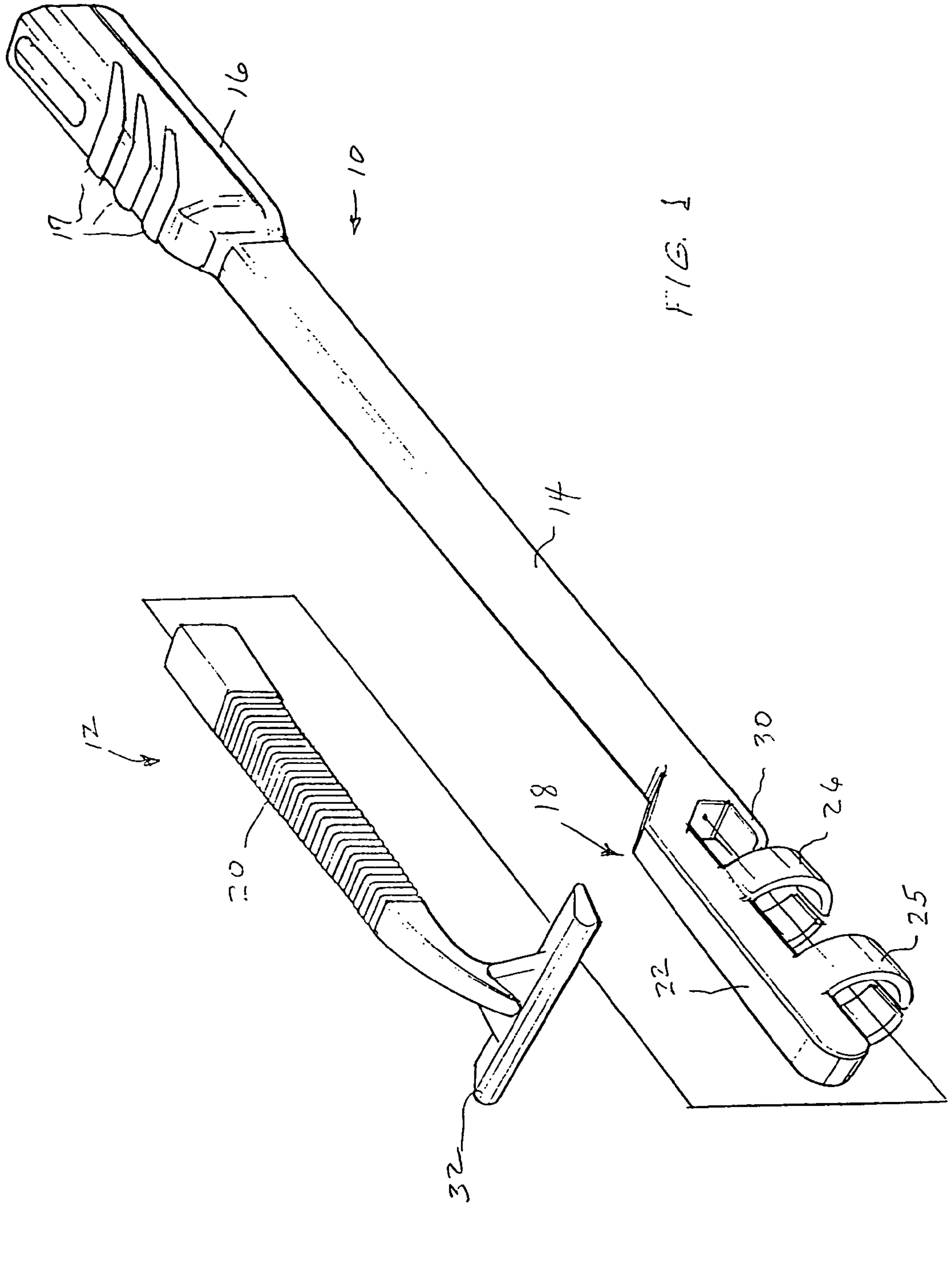
FIG. 1 is an exploded view in perspective of an extended handle in accordance with the present invention and a standard safety razor.
Figure 5:
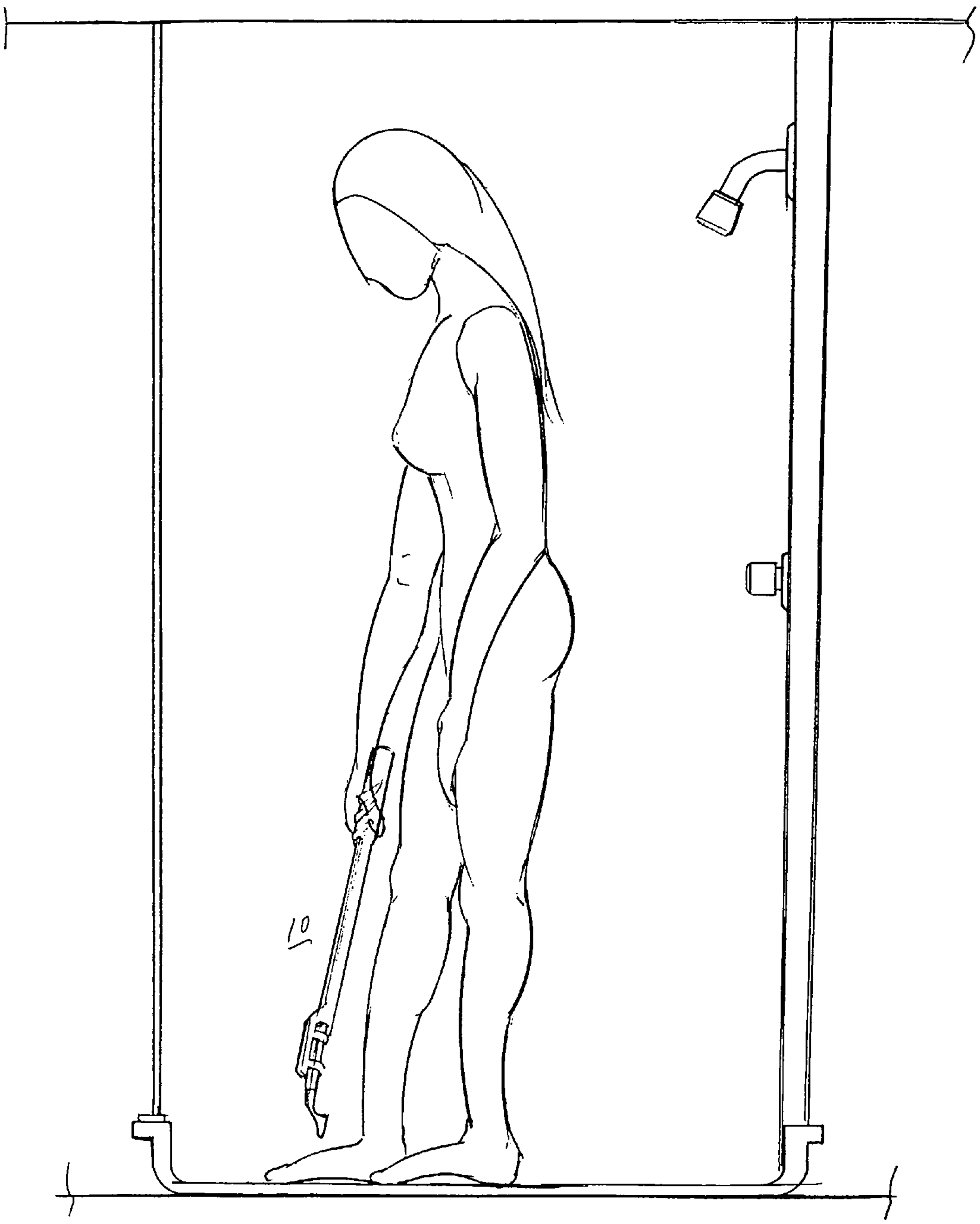
FIG. 5 is a perspective view of the safety razor handle and safety razor in use.

Turning now to the drawings, attention is first directed to FIG. 1 which illustrates a safety razor handle assembly 10 and cooperating safety razor 12 in accordance with the present invention. Safety razor handle assembly 10 includes an elongated body portion 14, a hand gripping portion 16 at one end, and a razor engaging portion 18 at the other end. Body portion 14 may be constructed of any light easily formable material, such as plastic (e.g., polyvinyl chloride (PVC), high-density polyethylene (HDPE), polyurethane (PU), etc.) or non-rusting metal (e.g., aluminum, etc.), and may be hollow and tapered to reduce the amount of material used and the weight. In a preferred embodiment, body portion 14 is approximately 14 inches in length with a maximum diameter of approximately two inches but it will be understood that a variety of lengths and thicknesses can be provided.

Gripping portion 16 is ergonomically fashioned for easy and comfortable gripping and may, for example, be an encasement formed around a base. In a preferred embodiment, gripping portion 16 is formed as a cylindrical encasement with one closed end so that it simply slides coaxially over the end of body portion 14. Further, the encasement may include any of various plastic foam materials of the flexible variety and with moisture-resistance and chemical resistance qualities, such as polyvinyl chloride foam, polyurethane (PU) foam, and in open-cell or closed-cell format.

Gripping portion 16 includes a plurality of soft spongy ribs 17 extending generally transverse to the handle. These soft spongy ribs extend or protrude outwardly a short distance and provide for a firm gripping action to ensure non-slipping under wet conditions. The diameter of gripping portion 16 is designed so that a lady of normal size can easily grip the assembly without being uncomfortable or without risk of slipping and cutting herself. A preferred diameter has been found to be in a range of approximately 2 inches to three inches but virtually any convenient and comfortable size and/or shape can be used.

Razor engaging portion 18 at the opposite end of body portion 14 is formed as an integral part of body portion 14 in this example but it will be understood that it may be formed as a separate component that simply coaxially attaches to the end of body portion 14, as by threading, snap action (e.g., spring loaded detent), or the like. Generally, razor engaging portion 18 is approximately three inches long but may be any convenient length for firmly engaging the handle of a safety razor, as for example handle 20 of safety razor 12. Razor engaging portion 18 includes a "backbone" support member 22 that is laterally offset from the axis of body portion 14 but extends generally parallel to the axis.

In this embodiment, two handle gripping clips 25 and 26 are attached to backbone support member 22 in spaced apart relationship with clip 25 being adjacent the outer-most end of backbone support member 22 and clip 26 being spaced toward the mid section. Each clip 25 and 26 includes a pair of opposed arcuate or c-shaped segments that form an opening, in conjunction with the inner surface of backbone support member 22, substantially coaxial with body portion 14. Also, the arcuate segments are at least partially resilient or springy so that handle 20 of safety razor 12 is gripped tightly therebetween to prevent any inadvertent rotation or axial movement.

A guide or lip 30 extends axially outward from the near end of razor engaging portion 18 generally parallel with the inner surface of backbone support member 22 and is positioned to engage one surface of handle 20 of razor 12 at the substantially square end thereof to aide in preventing inadvertent rotation during use. Thus, handle 20 of razor 12 can be slid axially into razor engaging portion 18 (see FIG. 2) and is substantially locked in place so that handle 20 is coaxially extended from body portion 14 with the head 32 of razor 12 extending outwardly beyond razor engaging portion 18 (see FIGS. 2 and 3) for easy use thereof. It will of course be understood that other razor engaging apparatus can be incorporated but razor engaging portion 18 is preferred for its simplicity and light weight.

A slightly different embodiment of a safety razor handle assembly, designated 10', is illustrated in FIG. 4. In this embodiment elongated body portion 14' is formed with two components 35' and 36'. Component 35' is formed to telescope within component 36' to allow for extending and reducing the axial length of elongated body portion 14'. A rotatable lock 38' is included in component 36' adjacent the junction of the two components and is operated to firmly lock the two components in any desired extension. Thus, elongated body portion 14' can be easily and conveniently extended or reduced in length to accommodate different portions of the legs or body or to allow for the use of women of different height. Also, in this embodiment, safety razor engaging portion 18' is threadedly engaged in the end of elongated body portion 14' so that it may be easily replaced with an engaging portion that engages devices other than safety razors.

Thus, a safety razor handle assembly designed to engage a safety razor having a handle and a razor blade head has been disclosed which receives and firmly grips the safety razor for use on legs and the like in showers and bath areas. With a safety razor engaged in the handle assembly a user may shave their legs without reaching or bending, within any type of bathing and/or showering unit, and without placing herself at risk of slipping and falling. The handle assembly has a non-slip easy grip handle at one end for ease in manipulation of the assembly. It should be understood that other types of razor engaging/gripping apparatus might be used and in a preferred embodiment the razor engaging portion may be removed and replaced (or designed to receive) with apparatus for performing other tasks (e.g., sponges brushes, cloths, etc.)

Various changes and modifications to the embodiment herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A safety razor handle assembly designed to engage a safety razor having a handle and a razor blade head, the assembly comprising an elongated body portion having a hand gripping portion affixed to one end and a safety razor engaging portion affixed to the other end, the razor engaging portion for engaging the handle of the safety razor so that the handle of the safety razor extends axially from the elongated body portion and the blade head of the safety razor extends laterally beyond the safety razor engaging portion, the safety razor engaging portion includes a backbone offset axially from the elongated body portion and two spaced apart clips each including a pair of opposed semi-resilient c-shaped members positioned to cooperate to firmly encircle and grip the handle of the safety razor, a guide extends axially outward from the elongated body portion generally parallel with the backbone for engaging a surface of the handle of the safety razor at an end thereof.

2. A safety razor handle assembly as claimed in claim 1 wherein the hand gripping portion includes an encasement positioned coaxially over the one end of the elongated body portion and the encasement includes non-slip, moisture resistant plastic foam.

3. A safety razor handle assembly as claimed in claim 2 wherein the non-slip, moisture resistant plastic foam includes one of polyvinyl chloride (PVC) foam and polyurethane (PU) foam.

4. A safety razor handle assembly as claimed in claim 2 wherein the encasement further includes a plurality of lateral ribs protruding above the surface.

5. A safety razor handle assembly as claimed in claim 1 wherein the elongated body portion includes a tubular and tapering section.

6. A safety razor handle assembly as claimed in claim 1 wherein the elongated body portion includes two telescoping members to provide for extending and reducing the length.

7. A safety razor handle assembly as claimed in claim 1 wherein the elongated body portion includes one of polyvinyl chloride (PVC), high-density polyethylene (HDPE), and polyurethane (PU).

8. A safety razor handle assembly as claimed in claim 1 wherein the elongated body portion is approximately 14 inches long and less than approximately two inches in diameter.

9. A safety razor handle assembly comprising:

a safety razor having a handle and a razor blade head;

an elongated body portion;

a hand gripping portion affixed to one end of the elongated body portion; and a safety razor engaging portion affixed to the other end, the safety razor engaging portion engaging the handle of the safety razor so that the handle of the safety razor extends axially from the elongated body portion and the blade head of the safety razor extends laterally beyond the safety razor engaging portion;

the safety razor engaging portion includes a backbone offset axially from the elongated body portion and two spaced apart clips each including a pair of opposed semi-resilient c-shaped members positioned to cooperate to firmly encircle and grip the handle of the safety razor, a guide extends axially outward from the elongated body portion generally parallel with the backbone and engages a surface of the handle of the safety razor at an end thereof.

10. A safety razor handle assembly as claimed in claim 9 wherein the hand gripping portion includes an encasement positioned coaxially over the one end of the elongated body portion and the encasement includes non-slip, moisture resistant plastic foam.

11. A safety razor handle assembly as claimed in claim 10 wherein the non-slip, moisture resistant plastic foam includes one of polyvinyl chloride (PVC) foam and polyurethane (PU) foam.

12. A safety razor handle assembly as claimed in claim 10 wherein the encasement further includes a plurality of lateral ribs protruding above the surface.

13. A safety razor handle assembly as claimed in claim 9 wherein the elongated body portion includes a tubular and tapering section.

14. A safety razor handle assembly as claimed in claim 9 wherein the elongated body portion includes two telescoping members to provide for extending and reducing the length.

15. A safety razor handle assembly as claimed in claim 9 wherein the elongated body portion includes one of polyvinyl chloride (PVC), high-density polyethylene (HDPE), and polyurethane (PU).

16. A safety razor handle assembly as claimed in claim 9 wherein the elongated body portion is approximately 14 inches long and less than approximately two inches in diameter.

* * * * *